(12) United States Patent
Chong et al.

(10) Patent No.: US 10,645,567 B2
(45) Date of Patent: *May 5, 2020

(54) METHODS AND SYSTEMS FOR CONFIGURING RADIO FREQUENCY MODULE

(71) Applicant: Pismo Labs Technology Limited, Kowloon (HK)

(72) Inventors: Ming Pui Chong, Kowloon (HK); Man Kit Kwan, New Territories (HK)

(73) Assignee: PISMO LABS TECHNOLOGY LIMITED, Kowloon (HK)

(*) Notice: Subject to any disclaimer, the term of this patent is extended or adjusted under 35 U.S.C. 154(b) by 0 days.

This patent is subject to a terminal disclaimer.

(21) Appl. No.: 16/356,946

(22) Filed: Mar. 18, 2019

(65) Prior Publication Data

US 2019/0215681 A1 Jul. 11, 2019

Related U.S. Application Data

(63) Continuation of application No. 15/438,788, filed on Feb. 22, 2017, now Pat. No. 10,237,724, which is a
(Continued)

(51) Int. Cl.
*H04W 8/18* (2009.01)
*H04W 12/06* (2009.01)
(Continued)

(52) U.S. Cl.
CPC .......... *H04W 8/183* (2013.01); *H04B 1/3816* (2013.01); *H04L 41/082* (2013.01);
(Continued)

(58) Field of Classification Search
CPC ..... H04W 8/183; H04W 12/06; H04B 1/3816
See application file for complete search history.

(56) References Cited

U.S. PATENT DOCUMENTS

| 6,366,777 B1* | 4/2002 | Uusitalo | H04W 8/08 455/432.1 |
| 9,585,001 B2* | 2/2017 | Chong | H04W 12/06 |

(Continued)

FOREIGN PATENT DOCUMENTS

| CN | 101355758 A | 1/2009 |
| CN | 101540976 A | 9/2009 |

(Continued)

OTHER PUBLICATIONS

International Search Report in International Application No. PCT/IB2014/061578, dated Feb. 26, 2015.
(Continued)

*Primary Examiner* — Bobbak Safaipour
(74) *Attorney, Agent, or Firm* — Hershkovitz & Associates, PLLC; Abe Hershkovitz

(57) ABSTRACT

The present invention discloses methods and systems for configuring at least one radio frequency (RF) module by a wireless communication apparatus. The wireless communication apparatus sends a first message to the at least one RF module, and the first message comprises a request for at least one international mobile subscriber identity (IMSI) of at least one subscriber identity module (SIM) card. A second message is then received from the RF module, and the second message comprises the at least one IMSI. The wireless communication apparatus determines which wireless network service provider(s) the at least one SIM card is associated with. The wireless communication apparatus identifies at least one configuration information. The wireless communication apparatus then sends a third message to the at least one RF module, and the third message comprises the at least one configuration information. The at least one RF module is then configured based on the at least one configuration information.

20 Claims, 11 Drawing Sheets

Related U.S. Application Data continuation of application No. 14/410,096, filed as application No. PCT/IB2014/061578 on May 21, 2014, now Pat. No. 9,585,001.

(51) Int. Cl.
  *H04L 12/24* (2006.01)
  *H04W 76/10* (2018.01)
  *H04B 1/3816* (2015.01)

(52) U.S. Cl.
  CPC ......... *H04L 41/0866* (2013.01); *H04W 12/06* (2013.01); *H04W 76/10* (2018.02)

(56) References Cited

U.S. PATENT DOCUMENTS

| | | | |
|---|---|---|---|
| 2003/0153356 A1* | 8/2003 | Liu | H04B 1/3816 455/558 |
| 2009/0029736 A1 | 1/2009 | Kim et al. | |
| 2012/0051285 A1 | 3/2012 | Hou | |
| 2012/0159218 A1* | 6/2012 | Vangala | G06F 9/5094 713/323 |
| 2013/0303203 A1* | 11/2013 | Wang | H04W 68/00 455/458 |
| 2014/0199962 A1* | 7/2014 | Mohammed | H04M 15/70 455/406 |
| 2014/0200048 A1* | 7/2014 | Cheng | H04B 1/3816 455/558 |
| 2014/0323175 A1* | 10/2014 | Shah | H04W 76/10 455/550.1 |
| 2015/0099559 A1* | 4/2015 | Bendixen | H04W 76/14 455/552.1 |
| 2015/0141012 A1* | 5/2015 | Ramkumar | H04W 48/20 455/435.3 |
| 2015/0181043 A1* | 6/2015 | Baek | H04W 4/16 455/417 |
| 2016/0066253 A1* | 3/2016 | Kollu | H04M 11/066 370/328 |
| 2016/0360456 A1* | 12/2016 | Vashi | H04W 36/14 |
| 2017/0347220 A1* | 11/2017 | Hole | H04W 4/50 |

FOREIGN PATENT DOCUMENTS

| | | |
|---|---|---|
| CN | 102036186 A | 4/2011 |
| CN | 102045700 A | 5/2011 |

OTHER PUBLICATIONS

Written Opinion of the International Searching Authority in International Application No. PCT/IB2014/061578, dated Feb. 26, 2015.
International Preliminary Report on Patentability Chapter I in International Application No. PCT/IB2014/061578, dated Nov. 22, 2016.
Search Report in Chinese Patent Application No. 201480076978.4, dated Dec. 5, 2018.
Office Action in Chinese Patent Application No. 201480076978.4, dated Dec. 17, 2018.
English language Abstract of CN 102045700 A (May 4, 2011).
English language Abstract of CN 102036186 A (Apr. 27, 2011).
English language Abstract of CN 101355758 A (Jan. 28, 2009).

* cited by examiner

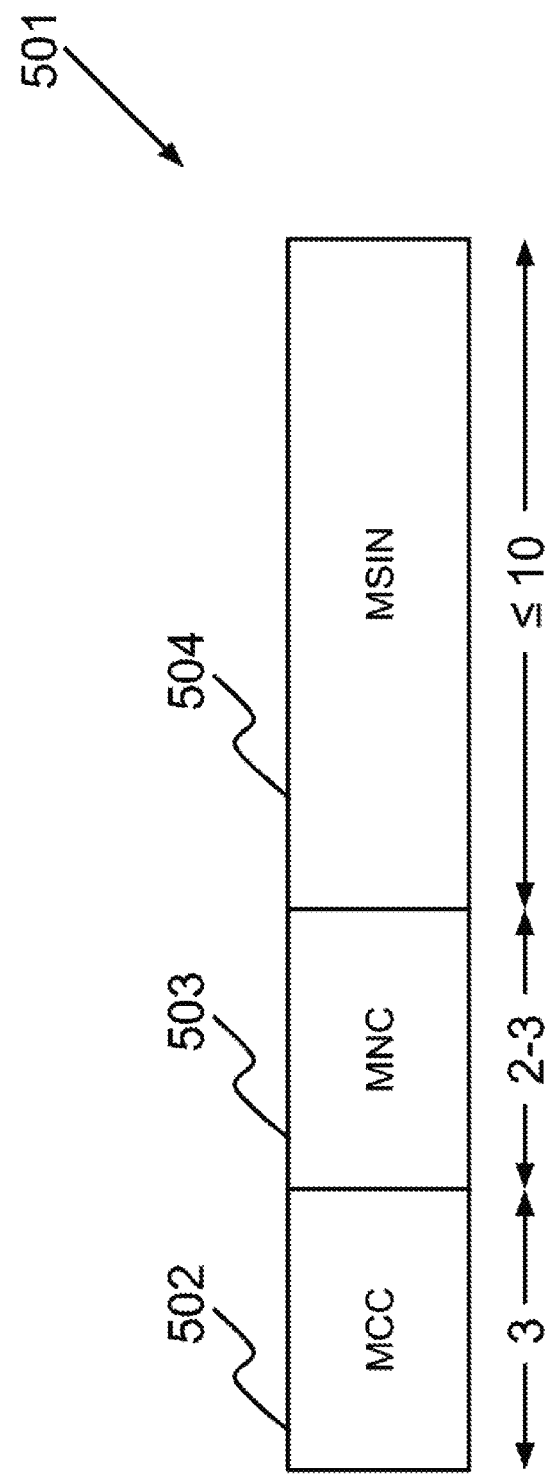

METHODS AND SYSTEMS FOR CONFIGURING RADIO FREQUENCY MODULE

RELATED APPLICATIONS

The present application is a non-provisional Continuation application which claims the benefits of and is based on U.S. application Ser. No. 15/438,788, titled "METHODS AND SYSTEMS FOR CONFIGURING RADIO FREQUENCY MODULE", filed on Feb. 22, 2017, which is a non-provisional Continuation application which claims the benefits of and is based on U.S. application Ser. No. 14/410,096, now U.S. Pat. No. 9,585,001, titled "METHODS AND SYSTEMS FOR CONFIGURING RADIO FREQUENCY MODULE", filed on Dec. 21, 2014, which is a National Stage Entry of PCT/IB2014/061578 filed on May 21, 2014, the disclosures of which are hereby incorporated by specific reference thereto.

TECHNICAL FIELD

The present invention relates in general to the field of computer networks. More particularly, the present invention relates to methods and systems for configuring a Radio Frequency (RF) module by a wireless communication apparatus. A configuration in-formation is sent to the RF module, where the configuration information is identified according to an international mobile subscriber identity (IMSI) of a subscriber identity module (SIM) card.

BACKGROUND ART

Wireless communication apparatus that have cellular capabilities can use a Radio Frequency (RF) module for communicating with base stations of different wireless network service providers. An RF module can be configured manually to switch from one operating mode to another when a Subscriber Identity Module (SIM) card is changed or identity of wireless network service provider changes. Depending on the wireless network service provider, settings at the RF module may be different for different wireless network service provider or different type of service provided by wireless network service providers. In this way, the same wireless communication apparatus can operate with different SIM cards or different wireless network service providers.

U.S. Pat. No. 8,346,255 discloses configuring a mobile wireless communication device with configuration profiles based on a set of identifier values. U.S. Pat. No. 8,346,255 fails to disclose methods for configuring an RF module. It also fails to disclose methods for configuring the RF module of a wireless communication apparatus. Further, it also fails to disclose methods for configuring based on international mobile subscriber identity (IMSI) only.

As different wireless network service providers may use different frequency values, different protocols, and different settings while providing services to wireless communication apparatus, the wireless communication apparatus may need to configure one or more of its RF modules accordingly in order to use the wireless communication services provided by the wireless network service providers.

There is a need for methods and systems for configuring RF modules of wireless communication apparatus in order to allow the wireless communication apparatus to be able to use wireless communication services provided by different wireless network service providers.

DISCLOSURE OF INVENTION

Summary of Invention

The present invention discloses methods and systems for configuring at least one radio frequency (RF) module by a wireless communication apparatus. The wireless communication apparatus sends a first message to the at least one RF module, and the first message comprises a request for at least one international mobile subscriber identity (IMSI) of at least one subscriber identity module (SIM) card. A second message is then received from the at least one RF module, and the second message comprises the at least one IMSI of the at least one SIM card. The RF module retrieves the at least one IMSI from the at least one SIM card. The wireless communication apparatus determines which wireless network service provider(s) the at least one SIM card is associated with. Based on the wireless network service provider, the wireless communication apparatus identifies at least one configuration information. The wireless communication apparatus then sends a third message to the at least one RF module, and the third message comprises the at least one configuration information. The at least one RF module is then configured based on the at least one configuration information.

According to one of the embodiments, the configuration information can be information corresponding to a firmware, a firmware or one or more settings. The one or more settings can be selected from a group consisting of a frequency value, an Access Point Name (APN), an authentication information, a network type, and roaming network settings.

According to one of the embodiments, the configuration information is substantially based on Qualcomm MSM Interface (QMI) protocol.

According to one of the embodiments, when the wireless communication apparatus houses a plurality of SIM cards, the wireless communication apparatus assigns priorities to the plurality of SIM cards. The at least one IMSI retrieved is an IMSI of a SIM card with the highest priority. The priorities may be based on position of the plurality of SIM cards.

According to one of the embodiments, when the at least one configuration information is information corresponding to a firmware, the wireless communication apparatus determines whether the firmware is stored in the at least one RF module. If the firmware is not stored in the at least one RF module, the wireless communication apparatus sends the firmware to the at least one RF module. When the firmware is stored in the at least one RF module, the at least one RF module configures itself with the firmware.

According to one of the embodiments, the wireless communication apparatus sends a fourth message to the at least one RF module, and the fourth message comprising a request for a current configuration information of the at least one RF module. The wireless communication apparatus compares the current configuration information of the at least one RF module with the at least one configuration information. The wireless communication apparatus sends the configuration information to the at least one RF module and configures the at least one RF module with the configuration information if the current configuration information of the at least one RF module is not the same as the at least one configuration information. If the current configuration information of the at least one RF module is the same as the at least one configuration information, the wireless communication apparatus does not send the configuration information to the at least one RF module and also does not configure the RF module.

According to one of the embodiments, after configuring the at least one RF module, the wireless communication apparatus verifies whether the configuration of the at least one RF module has been changed according to the configuration information. The verifying may be performed by determining whether a fifth message received from the at least one RF module is same as an expected response. According to one of the embodiments, the wireless communication apparatus resets the at least one RF module after configuring.

BRIEF DESCRIPTION OF DRAWINGS

FIG. 5 illustrates a format of an international mobile subscriber identity (IMSI) of a SIM card inserted.

DETAILED DESCRIPTION

Figure 1A:
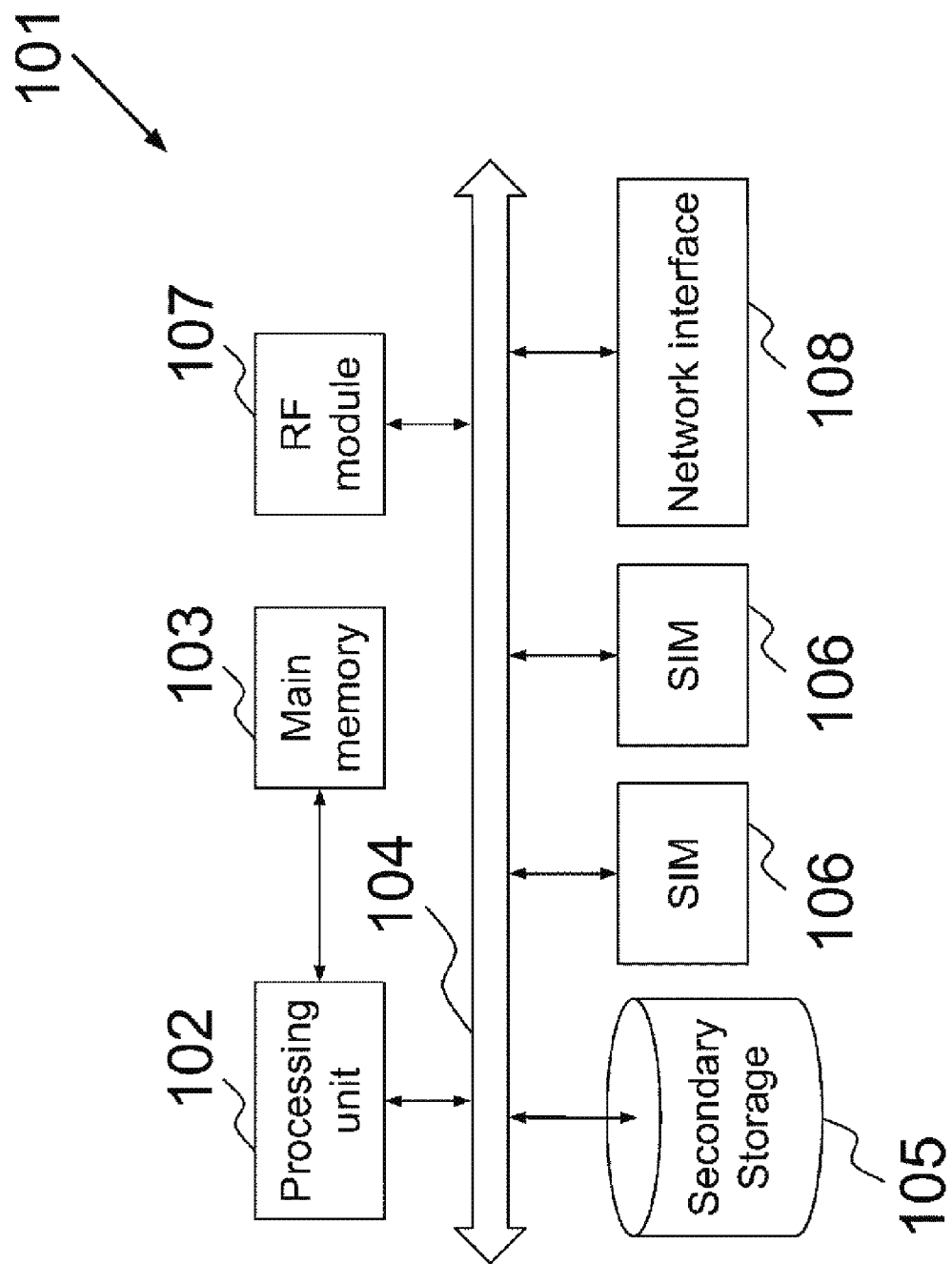
FIG. 1A is an illustrative block diagram of a wireless communication apparatus according to various embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough under-standing of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term computer-readable medium, main memory, or secondary storage, as used herein refers to any medium that participates in providing instructions to a processing unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infra-red data communications.

A volatile storage may be used for storing temporary variables or other intermediate information during execution of instructions by a processing unit. A non-volatile storage or static storage may be used for storing static information and instructions for processor, as well as various system configuration parameters.

The storage medium may include a number of software modules that may be implemented as software code to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alter-natively, a remote computer can load the instructions into its dynamic memory and send the instructions to the system that runs the one or more sequences of one or more instructions.

A processing unit may be a microprocessor, a microcontroller, a digital signal processor (DSP), any combination of those devices, or any other circuitry configured to process information.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface that may be provided by a node is an Ethernet interface, a frame relay interface, a fibre optic interface, a cable interface, a DSL interface, a token ring interface, a serial bus interface, an universal serial bus (USB) interface, Firewire interface, Peripheral Component Interconnect (PCI) interface, etc.

A network interface may be implemented by a standalone electronic component or may be integrated with other electronic components. A network interface may have no network connection or at least one network connection depending on the configuration. A network interface may be an Ethernet interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infra-red, High-Speed Packet Access (HSPA), HSPA+, Long Term Evolution (LTE), WiMax, General packet radio service (GPRS), Global System for Mobile Communications (GSM), Enhanced Data rates for GSM Evolution (EDGE), Code division multiple access (CDMA), WiFi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, local area network (LAN), metropolitan area network (MAN), wide area network (WAN), the PSTN, a satellite communication system, a cable transmission system, and/or the like.

Universal integrated circuit cards (UICC) are a form of § smart card used in wireless communication apparatus on various wireless communication networks. A well-known version of a UICC is a subscriber identity module (SIM) card that can be used in wireless communication apparatus on Global System for Mobile Communications (GSM) wireless communication networks. Equivalents of SIM cards also include universal mobile telecommunication system (UMTS) SIM (USIM) cards on UMTS networks and Code Division Multiple Access SIM (CSIM) cards on Code Division Multiple Access (CDMA) networks. SIM cards can be issued by a wireless communication service provider. When a SIM card is inserted into the cellular device, the processing unit of the wireless communication apparatus may then be able to identify which wireless communication service provider associated with SIM card.

In general, each SIM card used for wireless communication service has a unique serial number known as an international mobile subscriber identity (IMSI). The IMSI comprises a set of wireless network identification values. Portions of the IMSI can be accessed from the SIM card in wireless communication apparatus to configure the wireless communication apparatus for a particular wireless network service provider's network.

The present invention discloses methods for configuring one or more of radio frequency (RF) modules of the wireless communication apparatus by making use of the set of wireless network identification values.

FIG. 1A is an illustrative block diagram of a wireless communication apparatus, such as wireless communication apparatus 101 according to various embodiments of the present invention. Wireless communication apparatus 101 comprises processing unit 102, main memory 103, system bus 104, secondary storage 105, Subscriber Identity Module (SIM) card interface 106, Radio Frequency (RF) module 107, and network interface 108. Processing unit 102 and main memory 103 are connected to each other directly. System bus 104 connects processing unit 102 directly or indirectly to secondary storage 105, SIM card interface 106, RF module 107, and network interface 108. Using system bus 104 allows wireless communication apparatus 101 to have increased modularity. System bus 104 couples processing unit 102 to secondary storage 105, SIM card interface 106, RF module 107, and network interface 108. System bus 104 can be any of several types of bus structures including a memory bus, a peripheral bus, and a local bus using any of a variety of bus architectures. Secondary storage 105 stores program instructions for execution by processing unit 102. The scope of the invention is not limited to wireless communication apparatus 101 having one SIM card interface 106, RF module 107, or network interface 108, such that wireless communication apparatus 101 may have one or more SIM card interfaces 106, one or more RF modules 107, and one or more network interfaces 108. SIM cards can be inserted into SIM card interfaces 106. A SIM card socket can be a SIM card interface.

In a preferred embodiment, RF Module 107 used in the wireless communication apparatus 101 is a MC7354 available from Sierra Wireless.

Figure 1B:
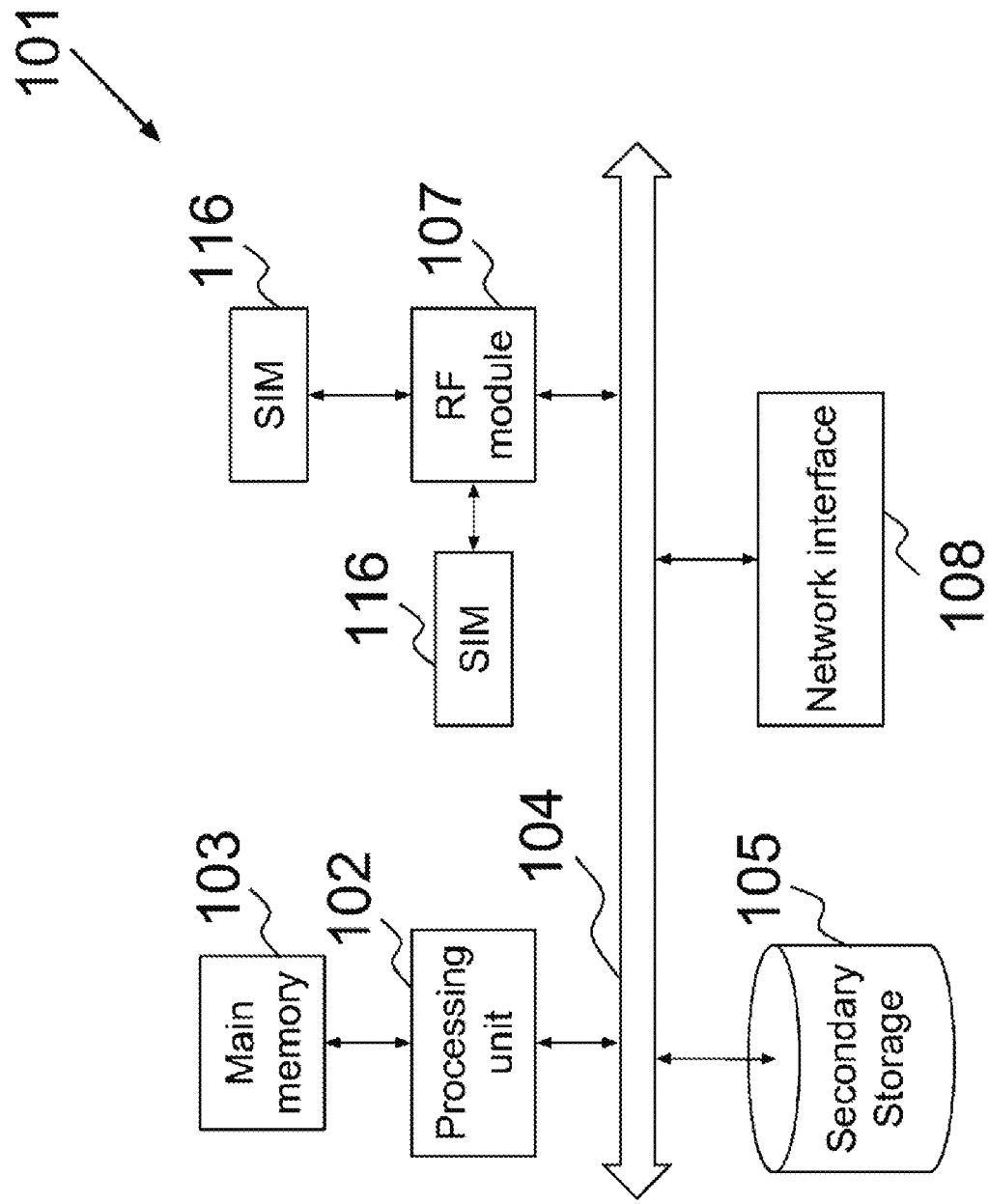
FIG. 1B is an illustrative block diagram of a wireless communication apparatus according to various embodiments of the present invention.

According to one of the embodiments, as illustrated in FIG. 1B, SIM card interface 116 and RF module 107 are connected to each other directly. SIM card interface 116 is not connected to system bus 104, and hence processing unit 102 can only communicate with SIM card interface 116 through RF module 107. RF module 107 may be connected to one or more SIM card interfaces 116.

In one variant, SIM card interfaces 106 and 116 may be embedded in wireless communication apparatus 101. Wireless communication apparatus 101 houses the SIM card(s) inserted in SIM card interfaces 106 or 116.

Alternatively, an external device may house one or more SIM cards, and the external device is connected to wireless communication apparatus 101. The external device may also house one or more RF modules 107, and thus RF module 107 is not housed by wireless communication apparatus 101. For example, the external device may be a Universal Serial Bus (USB) Long-Term Evolution (LTE) modem and wireless communication apparatus 101 connects to the external device through a USB interface. Wireless communication apparatus 101 is capable of connecting to one or more external devices.

Wireless communication apparatus 101 may be comprised in a wireless communication system. The wireless communication system comprises wireless communication apparatus 101, at least one RF module, and at least one SIM card interface. The at least one RF module is housed in the wireless communication apparatus or in an external device. The at least one SIM card interface is housed in the wireless communication apparatus or in the external device.

Figure 1C:
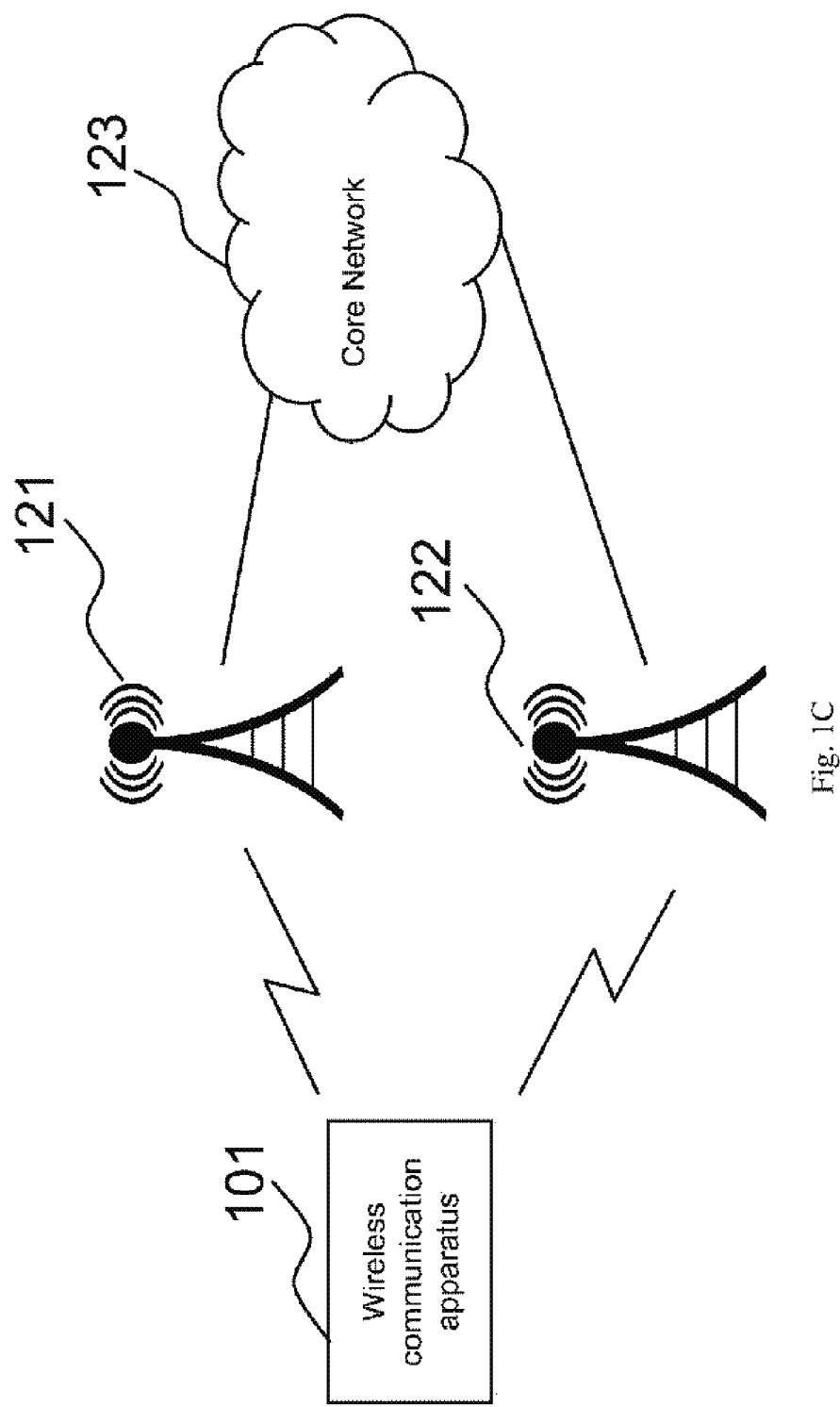
FIG. 1C illustrates a network environment according to one of the embodiments of the present invention.

FIG. 1C illustrates a network environment according to one of the embodiments of the present invention. Wireless communication apparatus 101 may connect to either base station 121 or base station 122 depending on which wireless network service provider a SIM card inserted in SIM card interface 106 is associated with. For example, wireless communication apparatus 101 may connect to an AT&T Mobility network through base station 121 if the SIM card is provided by AT&T Mobility. Alternatively, wireless communication apparatus 101 may connect to a Verizon network through base station 122 if the SIM card is provided by Verizon. Wireless communication apparatus 101 may access resources at core network 123 through base station 121 or 122. The resources may include hosts or servers accessible through core network 123.

FIG. 5 illustrates a format of an international mobile subscriber identity (IMSI) 501 specified in the international telecommunications recommendation ITU-T E.212 for a SIM card inserted in SIM card interface 106. The first set of three digits of the IMSI 501 can specify a mobile country code (MCC) 502. The next set of two or three digits of the IMSI 501 following the MCC 502 can specify a mobile network code (MNC) 503. The final set of not more than 10 digits can specify a mobile subscriber identification number (MSIN) 504. A country or a region can be associated with one or more MCC 502 values. For example, the MCC 502 values for US can be between "310" and "316", while MCC values for China and Hong Kong are "460" and "454" respectively. MNC 503 can be two digits or three digits. A wireless network service provider can be identified by the combination of the MCC 502 and MNC 503 values. A wireless network service provider may be associated with one or more MNC 503 for each MCC 502 value for the region of the wireless network service provider. For example, for MCC 502 value of "310", MNC 503 values that AT&T Mobility is currently associated with, include "070", "311", "380", "410", "560", and "680".

Figure 2A:
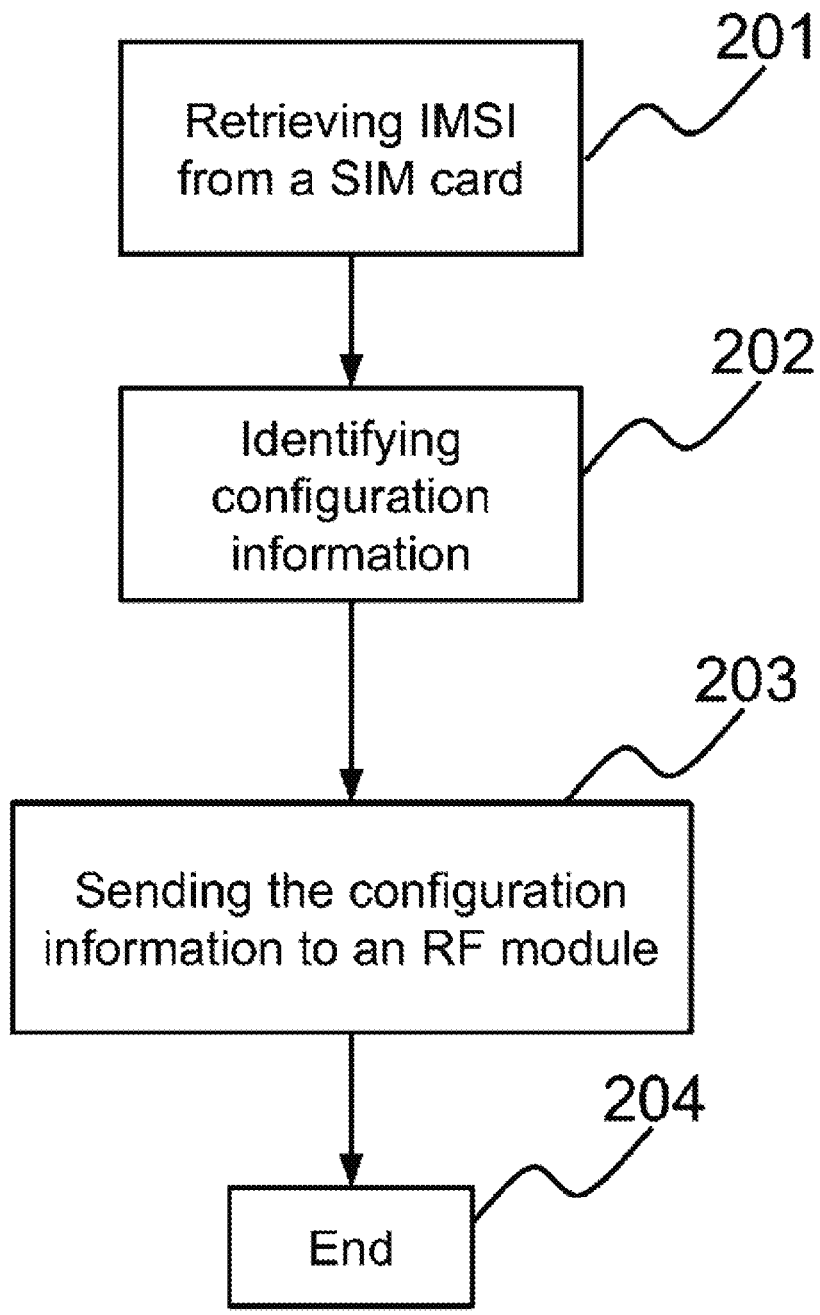
FIG. 2A is a flowchart illustrating a process according to one of the embodiments of the present invention.

FIG. 2A is a flowchart illustrating a process according to one of the embodiments of the present invention. Processing unit 102 of wireless communication apparatus 101 retrieves IMSI 501 in step 201. Processing unit 102 uses MCC 502 and MNC 503 to identify a wireless network service provider associated with the SIM card inserted in SIM card interface 106. A configuration information is then identified based on the identity of the wireless network service provider at step 202. The configuration in-formation is sent to RF module 107 in step 203 in order to configure RF module 107 to use setting(s) and/or an operating mode that corresponds to the identified wireless network service provider. The process ends at step 204. In one variant, RF module 107 is reset each time it is configured by sending a configuration information. In one example, RF module 107 can be reset by power-cycling RF module 107.

A configuration information may be a firmware, information of a firmware, one or more settings corresponding to a firmware, or any information that can be used to configure RF module 107.

For illustration purpose, retrieving IMSI 501 in step 201 comprise the following steps. Processing unit 102 first sends a first message to RF module 107 requesting for IMSI 501. RF module 107 then communicates with SIM card interface 106 and retrieves IMSI 501 from the SIM card inserted in SIM card interface 106. RF module 107 sends the retrieved IMSI 501 to processing unit 102 using a second message, and processing unit 102 thus retrieves IMSI 501.

After processing unit 102 has retrieved IMSI 501, it is able to determine which wireless network service provider the SIM card is associated with, and hence identifies a configuration information based on the wireless network service provider according to IMSI 501. For example, the configuration information is information corresponding to a firmware. Therefore, processing unit 102 determines a firmware that should be used by RF module 107 according to the identity of the wireless network service provider in step 202. Processing unit 102 sends a third message to RF module 107 in step 203 indicating the firmware corresponding to the wireless network service provider. In one variant, RF module 107 stores firmwares corresponding to one or more wireless network service providers in its own storage medium. When processing unit 102 sends the information of the firmware, RF module 107 configures itself with the corresponding firmware that is stored in a storage medium of RF module 107.

Figure 2B:
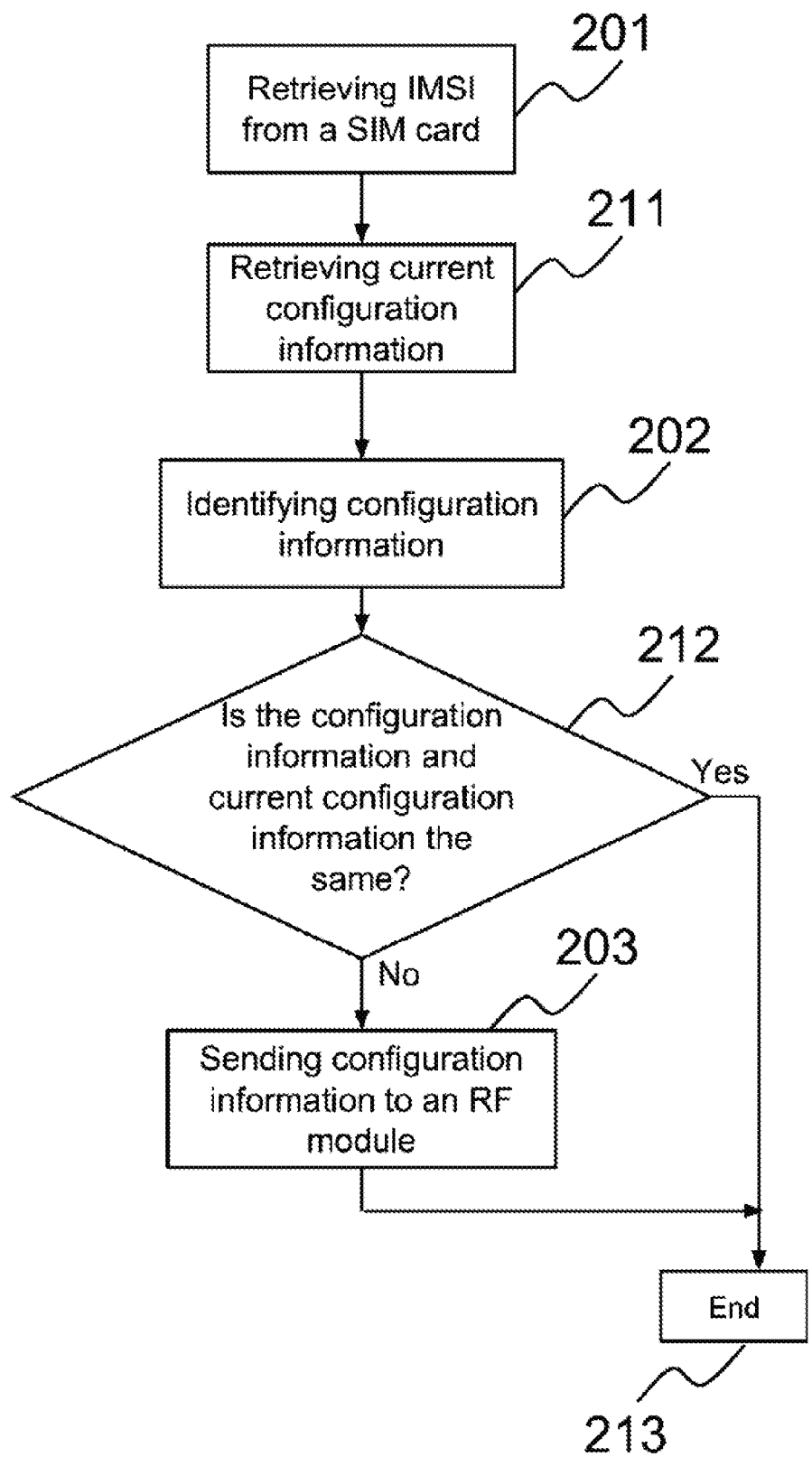
FIG. 2B is a flowchart illustrating a process according to one of the embodiments of the present invention.

In one variant, as illustrated in FIG. 2B, processing unit 102 sends a fourth message to RF module 107 requesting for the current configuration information of RF module 107 in step 211. The current configuration information is information of a configuration that RF module 107 has already been configured with. After identifying a configuration information based on the wireless network service provider in step 202, processing unit 102 compares the configuration information and the current con-figuration information and determines whether they are the same in step 212. If they are not the same, processing unit 102 sends the configuration information to RF module 107 in step 203, and the process ends at step 213. If they are the same, the configuration information is not sent to RF module 107, and the process ends at step 213.

For illustration purposes, with reference to the example above, where the configuration information is information of a firmware, processing unit 102 retrieves in-formation of the current firmware in step 211. The current firmware is the firmware with which the RF module has already been configured. Then in step 202, processing unit 102 identifies information of a firmware based on the identity of the wireless network service provider. In step 212, processing unit 102 determines whether the firmware identified in step 202 and the current firmware determined in step 211 are the same. If they are the same, processing unit 102 does not need to send the information of the firmware to RF module 107 in order to configure it with the firmware. If they are not the same, processing unit 102 sends the third message to RF module 107 in step 203 indicating the information of the firmware. The process ends in step 213.

For illustration purposes, the first, second, third, and fourth messages are Qualcomm MSM Interface (QMI) messages using QMI protocol. The first message and the second message correspond to step 201, and a command that queries the IMSI is "QMI_DMS_UIM_GET_IMSI". The service type of the command is DMS, and the DMS message ID is 0x0043. The first message, which is sent by processing unit 102 for requesting IMSI 501, is a request command "QMI_DMS_UIM_GET_IMSI_REQ". Similarly, the second message, which is sent by RF module 107 for indicating IMSI 501, is a response command "QMI_DMS_UIM_GET_IMSI_RESP".

The fourth message corresponds to step 211. The fourth message is sent by executing a function defined in the QMI protocol. The name of the function corresponding to the fourth message is "GetImagesPreference". The third message corresponds to step 203, and is sent by executing a function defined in the QMI protocol, which is named "SetImagesPreference". The function "SetImagesPreferences" can be executed with parameters according to the corresponding firmware, and hence RF module 107 is configured to use the corresponding firmware.

In one variant, the order of performing step 201 and 211 may be interchanged, such that, step 211 may be performed before step 201.

In one variant, referring to FIG. 2A and FIG. 2B, after step 203, RF module 107 is or reset after it is configured according to the configuration information sent by processing unit 102. Resetting RF module 107 may be required in order to apply changes corresponding to the configuration information. For example, when RF module 107 is configured with a firmware, RF module 107 is reset in order for the firmware to be applied, i.e., so that RF module 107 starts using settings corresponding to the firmware.

In one variant, when a SIM card is inserted or re-inserted in SIM card interface 106, the process of FIG. 2A or FIG. 2B is performed, and the RF module is reset. In another variant, when wireless communication apparatus 101 is turned on or restarted, the process of FIG. 2A or FIG. 2B is performed.

In one variant, the configuration information is a firmware. Processing unit 102 may retrieve a firmware from secondary storage 105 or main memory 103 and send the firmware to RF module 107 in step 203. RF module 107 is then configured with the firmware.

In one variant, the configuration information is a setting corresponding to a firmware. For example, the setting is a frequency to be used by RF module 107. Processing unit 102 identifies a frequency value or frequency band based on the wireless network service provider and sends the frequency value in step 203 to RF module 107. For illustration purpose, processing unit 102 determines that IMSI 501 of a SIM card inserted in SIM card interface 106 is "310070123456789". MCC 502 and MNC 503 values are "310" and "070" respectively. Therefore, processing unit 102 is able to identify that the wireless network service provider is AT&T Mobility. In step 202, processing unit 102 identifies a configuration information which is the frequency value. Processing unit 102 identifies the frequency value to be used is 700 MHz for AT&T Mobility. RF module 107 is configured with the configuration information and thus starts using 700 MHz for communicating.

The scope of the invention is not limited to the setting being a frequency value, such that the settings can be any settings of an RF module that can be configured by processing unit 102.

In one example, the setting is an Access Point Name (APN). RF module 107 uses the APN for having Internet Protocol (IP) based connectivity. For example, processing unit 102 determines the APN based on the identity of the wireless network service provider, and then sends the APN to RF module 107 so that wireless communication apparatus 101 can connect to the internet.

In another example, the setting is an authentication information. RF module 107 can be configured to use one of Password Authentication Protocol (PAP) and Challenge Handshake Authentication Protocol (CHAP). Processing unit 102 sends the setting to RF module 107 as the configuration information, and RF module 107 is configured to use an authentication protocol specified in the setting in order to connect to a network provided by the wireless network service provider.

In another example, the setting is a network type. When the SIM card is subscribed to a LTE service, RF module 107 can be configured to use a specific network type such as 2G, 3G, or LTE. Processing unit 102 can send a setting specifying a network type as the configuration information to RF module 107. RF module 107 is then configured to use the network type specified in the setting.

In another example, the setting is a roaming network setting. Processing unit 102 can enable or disable roaming services for RF module 107. Processing unit 102 can send a setting to enable roaming services or a setting to disable roaming services to RF module 107 as configuration information, and RF module 107 is configured according to the setting. When wireless communication apparatus is being used outside the area of coverage of a wireless network service provider associated with the SIM card, RF module 107 connects to a roaming network if the setting was to enable roaming services. Alternatively, RF module 107 does not connect to a roaming network if the setting was to disable roaming services.

The settings can be entered by a user or administrator of wireless communication apparatus locally or remotely through a web interface, an application programming interface (API), a command line interface, or a console. The settings can also be stored at secondary storage 105 or main memory 103 and retrieved by processing unit 102.

The difference between the processes in FIG. 2A and FIG. 2B is that, in FIG. 2B, RF module 107 is only configured to switch its operating mode and reset when the current configuration information is not the same as a configuration information identified in step 202. It is known to those skilled in the art that configuring and resetting RF module 107 may take a few minutes. When wireless communication apparatus 101 is turned on or restarted, RF module 107 may always be reset after step 203 in the process of FIG. 2A. However, in the process of FIG. 2B, RF module 107 is reset in step 203 only when the operating mode needs to be switched, i.e. the configuration in-formation and the current configuration information is determined not to be the same in step 212. On the other hand, the additional steps 211 and 212 in FIG. 2B may also cause a delay when turning on or restarting wireless communication apparatus 101.

In one of the embodiments of the present invention, when RF module 107 configures itself with a firmware corresponding to a wireless network service provider, RF module starts using settings that correspond to the firmware.

It is known to those skilled in the arts that a RF module, such as RF module 107, can operate on different frequencies depending on the wireless network service provider associated with a SIM card inserted in SIM card interface 106, and hence wireless communication apparatus 101 can have cellular connectivity through the wireless network provided by the wireless network service provider. For example, the frequency range used by Company A may be 1900 MHz or 1700 MHz and 2100 MHz, while the frequency range used by Company B may be 800 MHz or 1700 MHz and 2100 MHz. Similarly, the frequency range used by Company A for may be 800 MHz, 1900 MHz, or 2500 MHz.

For a better understanding, an illustrative scenario is provided here. For example, wireless communication apparatus 101 currently has a first SIM card inserted in SIM card interface 106, and the first SIM card is associated with AT&T Mobility. RF module 107 is currently configured with a first configuration corresponding to AT&T Mobility. The operating mode is configured for RF module 107 being used in AT&T network. Now, the first SIM card is ejected, and a second SIM card associated with Verizon Communications is inserted in SIM card interface 106. The configuration of RF module should be changed to a second configuration corresponding to Verizon Communications. When the second SIM card is inserted, processing unit 106 retrieves the IMSI of the second SIM card in step 201. When, in step 211, processing unit 102 retrieves the current configuration information, it is determined that the current con-figuration is the first configuration corresponding to AT&T mobility. In step 202, processing unit 102 identifies the second configuration corresponding to Verizon Communications. In step 212, it is determined that the current configuration is not the same as the second configuration, and hence, in step 203, processing unit 102 sends con-figuration information corresponding to Verizon Communications to RF module 107. RF module 107 is configured with the second configuration corresponding to Verizon Communications. The operating mode is configured for RF module 107 being used in Verizon network. Thus, RF module 107 starts using settings corresponding to Verizon Communications.

Figure 3A:
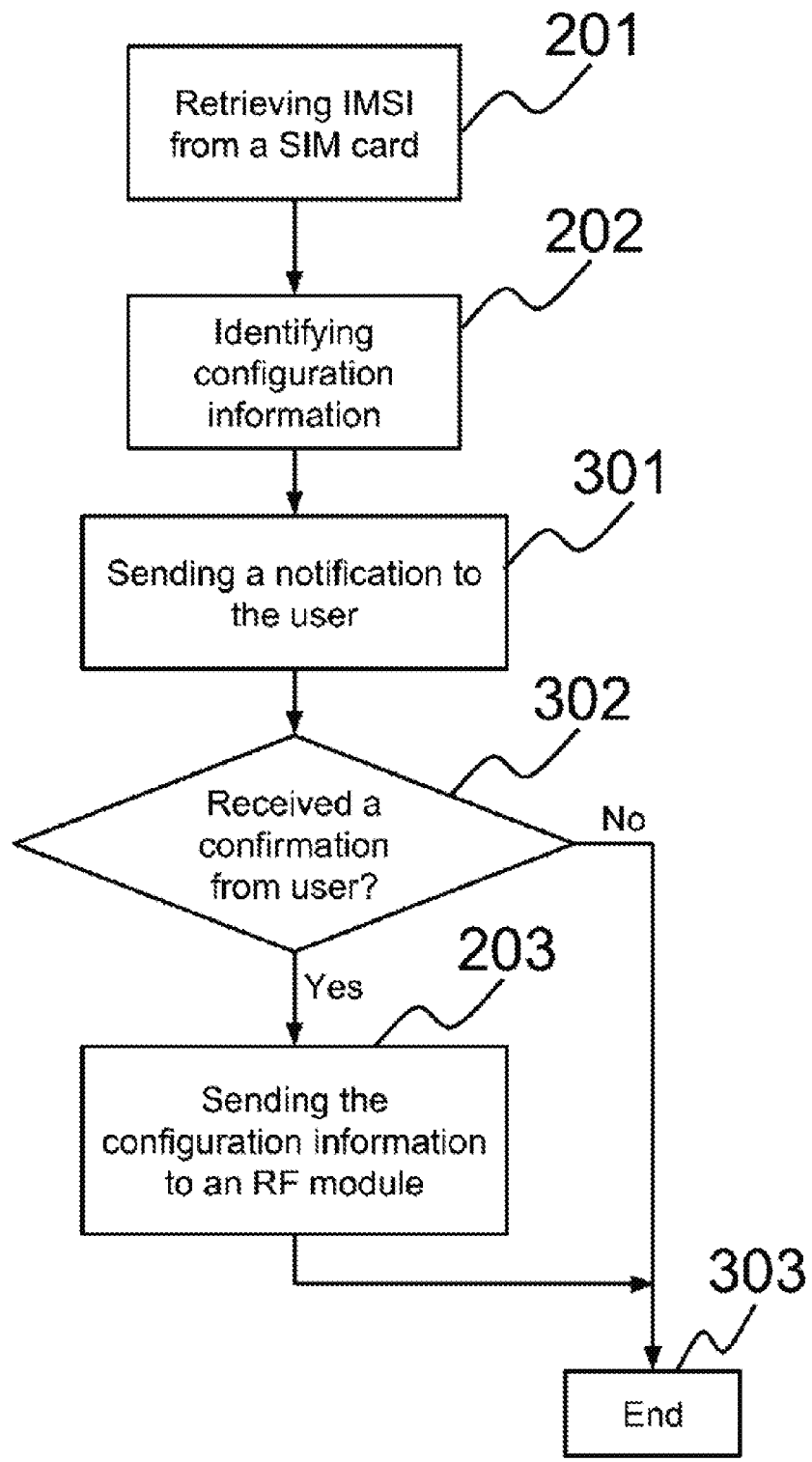
FIG. 3A is a flowchart illustrating a process according to one of the embodiments of the present invention.

FIG. 3A is a flowchart illustrating a process according to one of the embodiments of the present invention. After a configuration information is identified in step 202, a notification is sent to a user of wireless communication apparatus 101 in step 301, informing the user about the configuration information. The notification can be sent to the user through an email, an instant message, a SMS message, a phone call, a message shown in a web page, a popup message at a web page, or other indicators that can be used to send the notification to the user.

In step 302, processing unit 102 determines whether a confirmation is received from the user. The confirmation may be sent by the user to confirm sending configuration information to RF module 107. Therefore, if a confirmation is received, processing unit 102 sends the configuration information to RF module 107 in step 203. If no confirmation is received from the user, processing unit 102 does not send the configuration information to RF module 107 and the process ends at step 303.

For example, the configuration information is a roaming network setting which enables roaming services for RF module 107. Before processing unit 102 sends the configuration information to RF module 107, a user is informed that RF module 107 is going to be configured to connect to a roaming network. In order to avoid roaming charges, the user may not confirm sending the configuration information to RF module 107 so that roaming services are not enabled for RF module 107.

Figure 3B:
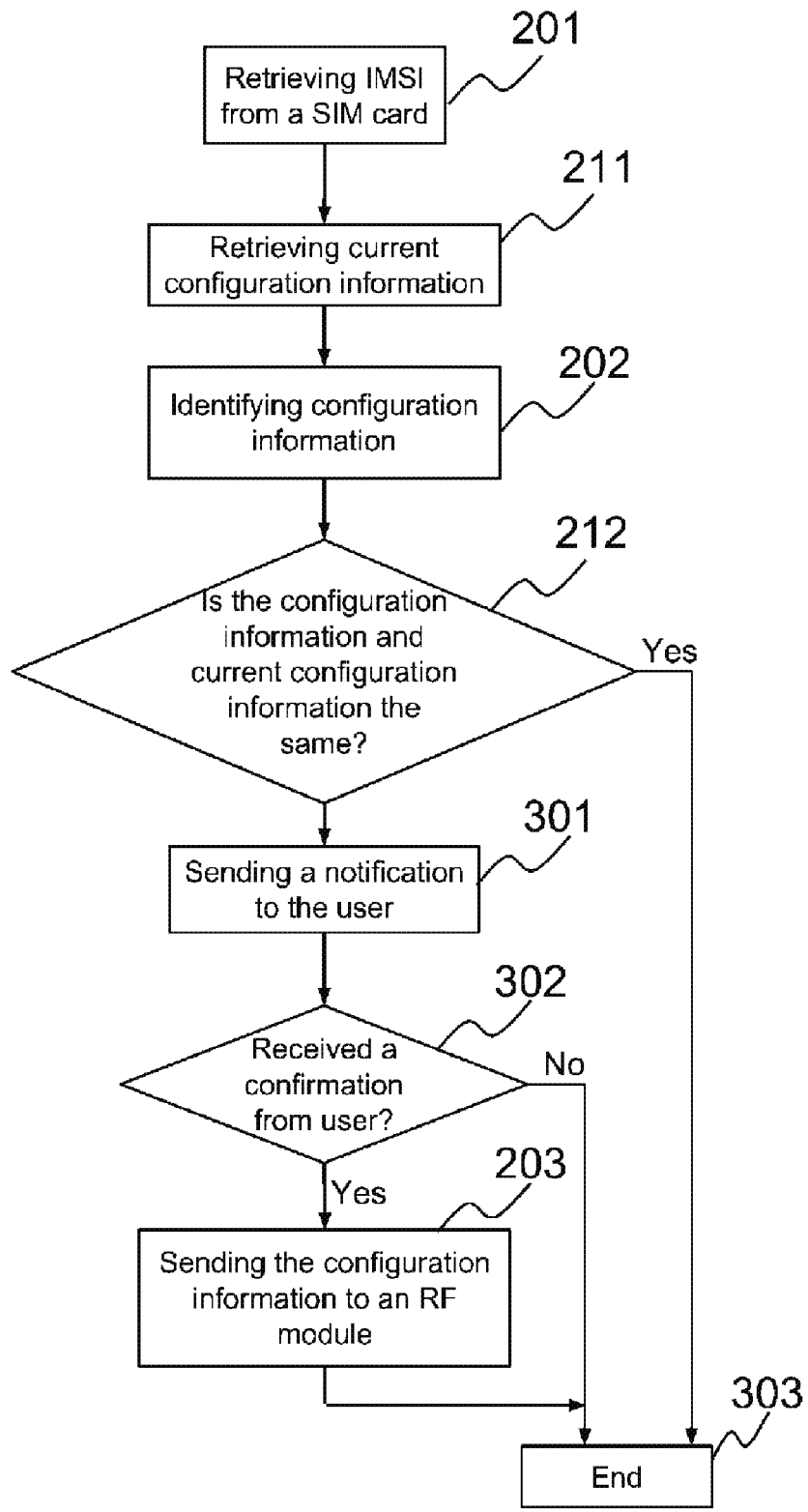
FIG. 3B is a flowchart illustrating a process according to one of the embodiments of the present invention.

In one of the embodiments, as illustrated in FIG. 3B, steps 301 and 302 may be performed after step 212 if the configuration information is not determined to be the same as the current configuration information in step 212.

Figure 4A:
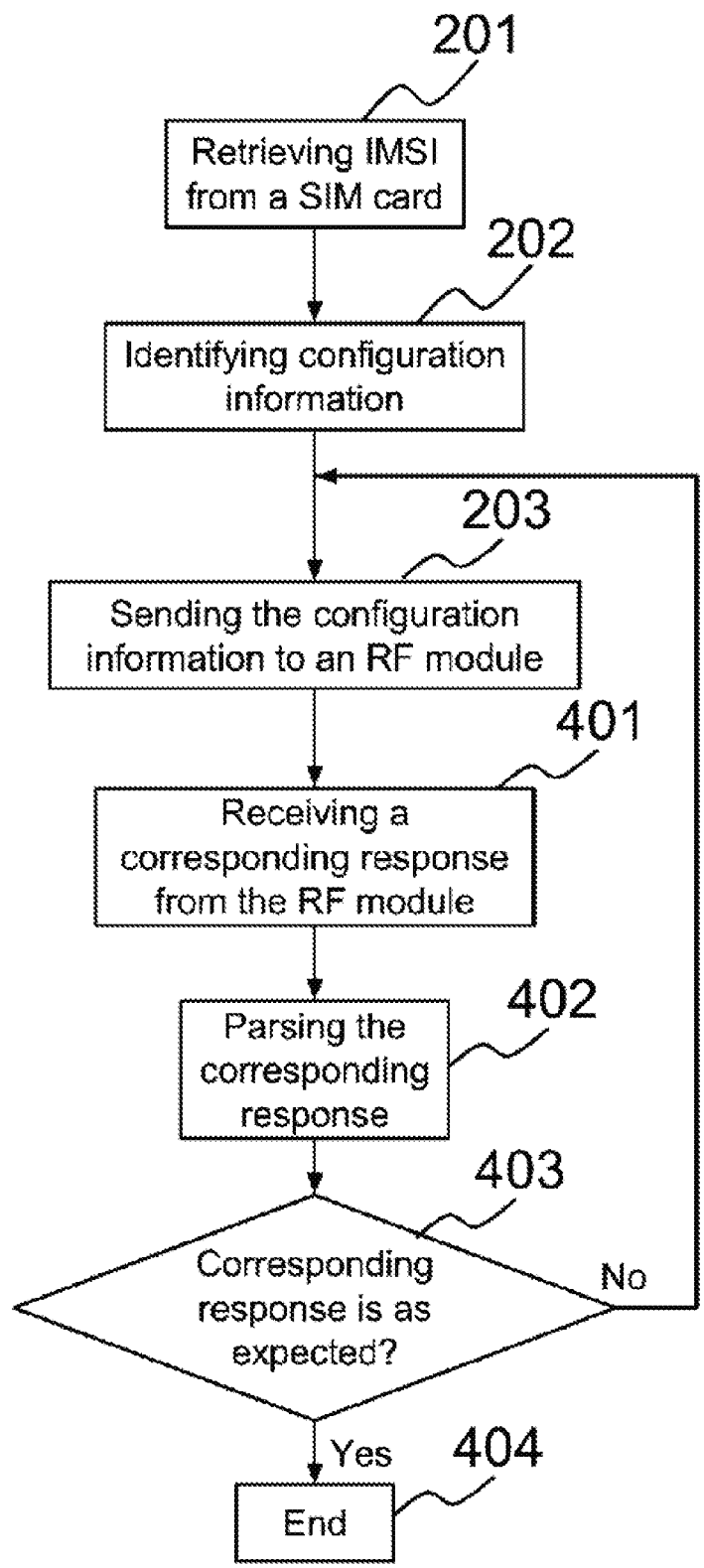
FIG. 4A is a flowchart illustrating a process according to one of the embodiments of the present invention.

FIG. 4A is a flowchart illustrating a process according to one of the embodiments of the present invention. After sending the configuration information to RF module 107 in step 203, processing unit 102 waits for RF module 107 to send a response corresponding to the third message. In step 401, wireless communication apparatus 101 receives a corresponding response from RF module 107. Processing unit 102 parses the corresponding response in step 402 to determine whether the corresponding response is as expected in step 403. If the corresponding response is determined to be as expected, the process ends in step 404. Alternatively, if the corresponding response is not as expected, processing unit 102 performs step 203 again, and sends the configuration in-formation to RF module 107.

In step 403, processing unit 102 may determine whether the corresponding response is as expected by comparing the corresponding response with an information that is predetermined and stored in secondary storage 105 or main memory 103. Alter-natively, the information may also be retrieved from a remote server. The information may comprise the expected response, such as an expected frequency.

For example, the third message comprises information of a firmware corresponding to AT&T mobility, and RF module 107 is configured with the firmware. When RF module 107 is configured with the firmware corresponding to AT&T mobility, RF module 107 uses a certain frequency range. In order to ensure that the correct frequency range is being used, RF module 107 sends a response indicating the frequency range using a fifth message. When processing unit 102 receives the fifth message in step 401, processing unit 102 determines whether the frequency range is as expected in step 403. This ensures that RF module 107 accurately received the third message and determined the frequency range. Processing unit 102 may retrieve the expected frequency range stored in secondary storage 105 or main memory 103 and compare it with the frequency range indicated in the fifth message. Hence processing unit 102 can determine whether the frequency range indicated in the fifth message is as expected.

Figure 4B:
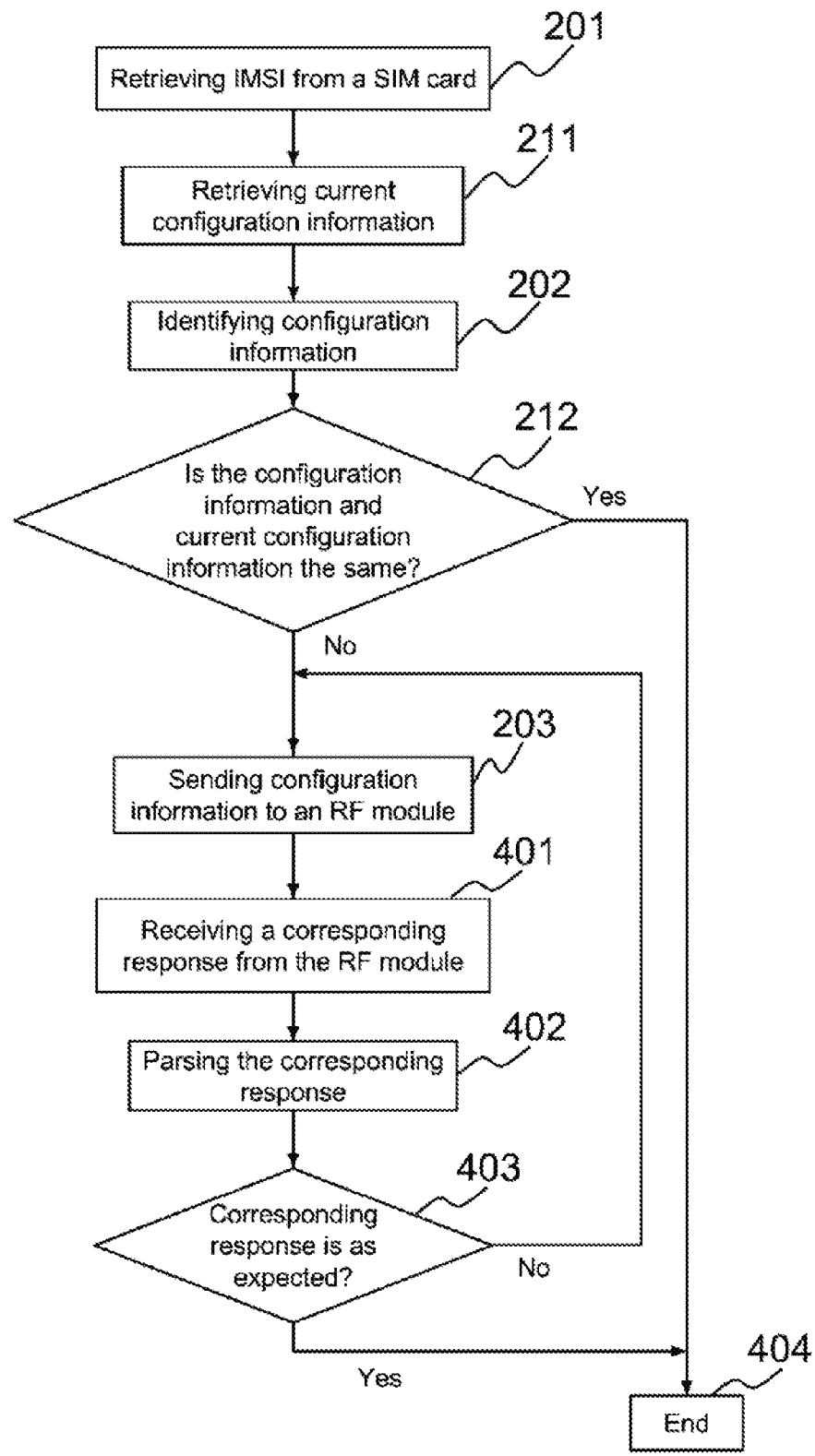
FIG. 4B is a flowchart illustrating a process according to one of the embodiments of the present invention.

In one of the embodiments, as illustrated in FIG. 4B, steps 401, 402 and 403 may be performed after step 212 if the configuration information is not determined to be the same as the current configuration information in step 212.

Figure 6:
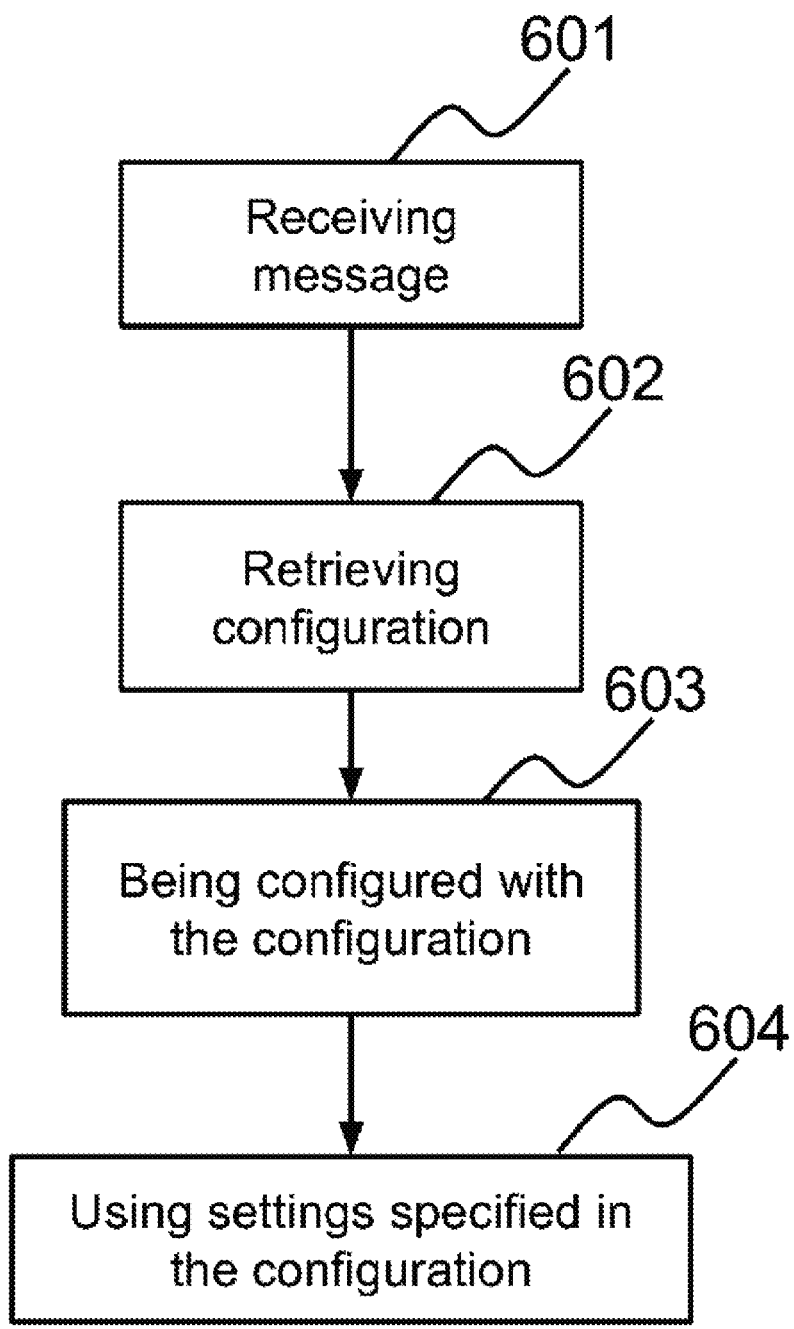
FIG. 6 is a flowchart illustrating a process according to one of the embodiments of the present invention.

FIG. 6 is a flowchart illustrating a process according to one of the embodiments of the present invention. RF module 107 receives a third message from processing unit 102 in step 601. The third message comprises a configuration information. The third message is sent in order to configure RF module 107 with a configuration according to the con-figuration information specified in the third message. In step 602, RF module 107 retrieves a configuration corresponding to the configuration information, and is then configured with the configuration in step 603. RF module 107 then starts using settings corresponding to the configuration information in step 604.

For example, the configuration information is information of the firmware. RF module 107 may have several firmwares stored in a storage medium. In step 602, RF module 107 retrieves the firmware that was specified in the configuration information, and RF module 107 is then configured with the corresponding firmware in step 603. In step 604, RF module 107 switches to an operating mode according to the firmware and uses settings specified in the firmware.

In one variant, RF module 107 should be reset after step 603 so that it may start using settings corresponding to the configuration information in step 604.

In one variant, RF module 107 may not have the firmware corresponding to the con-figuration information stored in its storage medium. In step 602, RF module 107 may then retrieve the firmware from a remote server or may send a message to processing unit 102. The message may comprise information that the firmware is not stored in RF module 107. The message may also comprise a request for sending the firmware to RF module 107 as a configuration information. When processing unit 102 receives the request for sending the firmware, processing unit 102 may retrieve the firmware locally from secondary storage 105 or main memory 102, or processing unit 102 may retrieve the firmware from a remote server. Processing unit 102 then sends the firmware as the configuration information to RF module 107, and thus RF module 107 is configured with the firmware. Alternatively, processing unit 102 may send a notification to the user requesting the user to manually store the firmware in RF module 107 or secondary storage 105 or main memory 103. RF module 107 can then be configured with the firmware.

According to one of the embodiments of the present invention, wireless communication apparatus 101 may have one or more SIM card interfaces 106 and one or more RF module 107. For example, when wireless communication apparatus 101 has a first SIM card interface 106 and a second SIM card interface 106. Priorities may be assigned to SIM cards inserted in the first and second SIM card interface 106. RF module 107 is configured based on IMSI 501 of a SIM card with highest priority. For illustration purpose, a first SIM card is inserted in the first SIM card interface 106, and a second SIM card is inserted in the second SIM card interface 106. The first SIM card is assigned with the highest priority and the second SIM card is assigned with the lowest priority. Therefore, processing unit 102 sends configuration information corresponding to IMSI 501 of the first SIM card to RF module 107, such that RF module 107 is configured to use settings or an operating mode corresponding to a wireless network service provider of the first SIM card. The priorities may be assigned to the first and second SIM card using a predefined configuration of wireless communication apparatus 101. Alternatively, a user of wireless communication apparatus 101 can assign the priorities to the first and second SIM card by configuring wireless communication apparatus 101 through a web interface, an application programming interface (API), a command line interface, or a console.

In one example, the priority is based on the position of a SIM card, i.e., whether a SIM card is housed in wireless communication apparatus 101, or the SIM card is housed in an external device.

According to one of the embodiments of the present invention, a SIM card interface selector connects a plurality of SIM card interfaces to RF module 107. The SIM card interface selector is controlled by processing unit 102. Examples of a SIM card interface selector for two SIM card interfaces include TXS02326 Dual-Supply 2:1 SIM Card Multiplexer/Translator supplied by Texas Instruments and LTC4557 Dual SIM/Smart Card Power Supply and Interface supplied by Linear Technology. Processing unit 102 may instruct the SIM card interface selector to select one of the SIM card interfaces from the plurality of SIM card interfaces.

According to one of the embodiments, the selection may be performed according to received signal quality, predefined priority, preferences, price and etc.

According to one of the embodiments of the present invention, processing unit 102 may use the SIM card interface selector to select a SIM card based on event triggers. Event triggers include but are not limited to a geographic location trigger, a data usage trigger, a received signal quality trigger, a time trigger, a duration of usage trigger, a billing cycle trigger etc. Event triggers may be referred to as a first event trigger and a second event trigger. Processing unit 102 may select a first SIM card and start using the first SIM card when the first event trigger occurs. Processing unit 102 may then stop using the first SIM card when the second event trigger occurs. Processing unit 102 may also start using a second SIM card when the second event trigger occurs. In one variant, a plurality of triggers can be combined to form an event trigger. For example, the first event trigger can be based on a geographic location trigger and a data usage trigger. In another example, the second event trigger can be based on the duration of usage trigger and the billing cycle information trigger. In one variant, the first event trigger and the second event trigger can be based on the same trigger(s).

In another example, wireless communication apparatus 101 houses or is connected to an external device housing a first SIM card, a second SIM card, and also a first RF module 107 and a second RF module 107. The first SIM card is inserted in a first SIM card interface 106, and the second SIM card is inserted in a second SIM card interface 106. For illustration purpose, processing unit 102 sends configuration information corresponding to IMSI 501 of the first SIM card to the first RF module 107, such that the first RF module 107 is configured to use settings or an operating mode corresponding to a wireless network service provider of the first SIM card. Similarly, processing unit 102 sends configuration information corresponding to IMSI 501 of the second SIM card to the second RF module 107, such that the second RF module 107 is configured to use settings or an operating mode corresponding to a wireless network service provider of the second SIM card.

In another example, wireless communication apparatus 101 may have a first RF module 107 and a second RF module 107. When the first SIM card interface 106 has a first SIM card inserted, but the second SIM card interface 106 does not have a second SIM card inserted, processing unit 102 may select one of the first RF module 107 and the second RF module 107 for sending configuration information corresponding to IMSI 501 of the first SIM card. For example, when the first RF module 107 is selected, processing unit 102 sends configuration information corresponding to IMSI 501 of the first SIM card to the first RF module 107, and the first RF module 107 is configured to use settings or an operating mode corresponding to a wireless network service provider of the first SIM card.

The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method for using a plurality of subscriber identity module (SIM) card interfaces at a wireless communication apparatus, comprising:
   (a) when a first event trigger occurs:
       i. stopping using a first SIM card interface;
       ii. selecting a second SIM card interface from the plurality of SIM card interfaces;
       iii. starting using the second SIM card interface;
   (b) when a second event trigger occurs:
       i. stopping using the second SIM card interface;
       ii. selecting an operational SIM card interface from the plurality of SIM card interfaces;
       iii. starting using the operational SIM card interface;
   wherein:
       the first SIM card interface, the second SIM card interface and the operational SIM card interface are coupled to at least one RF unit;
       the at least one RF unit is configured according to an international mobile subscriber identity (IMSI) of a SIM card inserted in one of the first SIM card interface, the second SIM card interface and the operational SIM card interface;
       each of the first event trigger and the second event trigger is based on one or more of the following: geographic location, data usage, received signal quality, time, duration of usage and billing cycle; and
       the first event trigger and the second event trigger are based on different criterion or criteria.

2. The method according to claim 1, wherein the operational SIM card interface is either the first SIM card interface or a SIM card interface other than the first SIM card interface and the second SIM card interface.

3. The method according to claim 1, wherein:
   the wireless communication apparatus comprises a plurality of RF units; and
   the at least one RF unit is in the plurality of RF units.

4. The method according to claim 3, wherein the plurality of RF units are housed in the wireless communication apparatus or in a first external device.

5. The method according to claim 4, wherein:
   the first SIM card interface and the second SIM card interface are housed in the wireless communication apparatus or in a second external device; and
   the second external device is either the first external device or a different external device.

6. The method according to claim 1, wherein:
   the first SIM card interface, the second SIM card interface and the operational SIM card interface are coupled to a multiplexer; and
   the multiplexer is configured to allow the at least one RF unit to use one of the first SIM card interface, the second SIM card interface and the operational SIM card interface.

7. The method according to claim 6, wherein the multiplexer is connected to one of a plurality of RF units and is configured based on a configuration information to connect to one of the first SIM card interface, the second SIM card interface and the operational SIM card interface.

8. The method according to claim 7, wherein the configuration information is retrieved from a locally connected storage device or from a remote server.

9. The method according to claim 1, wherein the first SIM card interface, the second SIM card interface and the operational SIM card interface are housed in the wireless communication apparatus or in an external device.

10. The method according to claim 1, wherein each of the plurality of SIM card interfaces is configured to hold a SIM card from different cellular network service providers.

11. A wireless communication apparatus for using a plurality of subscriber identity module (SIM) card interfaces, comprising:
    at least one processing unit;
    at least one network interface;
    a plurality of SIM card interfaces;
    at least one storage unit storing program instructions executable by the at least one processing unit for performing the steps of:
    (a) when a first event trigger occurs:
        i. stopping using a first SIM card interface;
        ii. selecting a second SIM card interface from the plurality of SIM card interfaces;
        iii. starting using the second SIM card interface;
    (b) when a second event trigger occurs:
        i. stopping using the second SIM card interface;
        ii. selecting an operational SIM card interface from the plurality of SIM card interfaces;
        iii. starting using the operational SIM card interface;
    wherein:
        the first SIM card interface, the second SIM card interface and the operational SIM card interface are coupled to at least one RF unit;
        the at least one RF unit is configured according to an international mobile subscriber identity (IMSI) of a SIM card inserted in one of the first SIM card interface, the second SIM card interface and the operational SIM card interface;
        each of the first event trigger and the second event trigger is based on one or more of the following: geographic location, data usage, received signal quality, time, duration of usage and billing cycle; and the first event trigger and the second event trigger are based on different criterion or criteria.

12. The wireless communication apparatus of claim 11, wherein the operational SIM card interface is either the first SIM card interface or a SIM card interface other than the first SIM card interface and the second SIM card interface.

13. The wireless communication apparatus of claim 11, wherein:
the wireless communication apparatus comprises a plurality of RF units; and
the at least one RF unit is in the plurality of RF units.

14. The wireless communication apparatus of claim 13, wherein the plurality of RF units are housed in the wireless communication apparatus or in a first external device.

15. The wireless communication apparatus of claim 14, wherein:
the first SIM card interface and the second SIM card interface are housed in the wireless communication apparatus or in a second external device; and
the second external device is either the first external device or a different external device.

16. The wireless communication apparatus of claim 11, wherein:
the first SIM card interface, the second SIM card interface and the operational SIM card interface are coupled to a multiplexer; and
the multiplexer is configured to allow the at least one RF unit to use one of the first SIM card interface, the second SIM card interface and the operational SIM card interface.

17. The wireless communication apparatus of claim 16, wherein the multiplexer is connected to one of a plurality of RF units and is configured based on a configuration information to connect to one of the first SIM card interface, the second SIM card interface and the operational SIM card interface.

18. The wireless communication apparatus of claim 17, wherein the configuration information is retrieved from a locally connected storage device or from a remote server.

19. The wireless communication apparatus of claim 11, wherein the first SIM card interface, the second SIM card interface and the operational SIM card interface are housed in the wireless communication apparatus or in an external device.

20. The wireless communication apparatus of claim 11, wherein each of the plurality of SIM card interfaces is configured to hold a SIM card from different cellular network service providers.

* * * * *